United States Patent [19]

Aibe et al.

[11] 4,032,175

[45] June 28, 1977

[54] KNEE PROTECTOR IN MOTOR VEHICLE

[75] Inventors: Tsuyoshi Aibe, Yokohama; Yoshiaki Sugiura, Yokosuka; Yuzuru Okada, Yokohama, all of Japan

[73] Assignee: Nissan Motor Co., Ltd., Yokohama, Japan

[22] Filed: May 2, 1975

[21] Appl. No.: 574,032

[30] Foreign Application Priority Data

May 9, 1974    Japan ............................. 49-52825

[52] U.S. Cl. .............................. 280/751; 188/1 C; 297/390
[51] Int. Cl.² .......................................... B60R 21/04
[58] Field of Search ............. 280/150 B, 748, 751, 280/752; 297/390; 180/90; 293/71 R, 71 P, 1, DIG. 3; 188/1 C

[56] References Cited

UNITED STATES PATENTS

| | | | |
|---|---|---|---|
| 2,769,653 | 11/1956 | Lazan, Jr. | 293/71 R |
| 3,675,746 | 7/1972 | Irvine | 188/1 C |
| 3,690,710 | 9/1972 | Curran | 293/71 R |
| 3,774,713 | 11/1973 | Stegmaier | 280/150 B X |
| 3,834,482 | 9/1974 | Wada et al. | 280/150 B X |
| 3,837,695 | 9/1974 | Haase et al. | 293/71 P |
| 3,861,486 | 1/1975 | Wilfert | 280/150 B X |
| 3,907,326 | 9/1975 | Arnston et al. | 180/90 X |
| 3,947,056 | 3/1976 | Schwanz | 180/90 X |

*Primary Examiner*—Joseph F. Peters, Jr.
*Assistant Examiner*—Michael J. Forman

[57] ABSTRACT

A knee protector anchored in the foot space below an instrument panel within the vehicle interior. The knee protector has an outer hollow body and a permanently deformable rounded wall disposed within the outer hollow body to control deformation of the outer hollow body under the impact of the knees of a vehicle passenger during a crash of the motor vehicle.

18 Claims, 8 Drawing Figures

KNEE PROTECTOR IN MOTOR VEHICLE

The present invention relates to a knee protector, in a motor vehicle, with a padded projection projecting into the vehicle interior and having in its functional area a permanently deformable wall. The knee protector is anchored in the vehicle foot space below a vehicle instrument panel.

Conventionally, various constructions of the knee protectors of motor vehicles have been proposed. One of the conventional knee protectors is provided with a padded projection protruding into a vehicle interior. The padded projection has permanently deformable support walls of a thin sheet metal defining a bore. The bore, which is an impact zone, in the conventional knee protector is a hollow, thus under the force of impact of knees of a vehicle passenger it collapse immediately during the initial stage of the impact of the vehicle passenger, thereby causing the knees of vehicle passenger to hit strongly against a vehicle body portion to which the knee protector is anchored. Thus, with the conventional knee protector, there is the danger that the knees of vehicle passenger are seriously injured. The aim of the present invention is to solve the above mentioned insufficiency of the conventional knee protectors.

The main object of the present invention is to provide a knee protector which permanently deforms under the impact of knees of a vehicle passenger during a frontal crash of the motor vehicle so as to absorb the kinetic energy of the passenger at a controlled rate without giving the knees an impact having a magnitude that might cause an injury of the knees of the vehicle passenger.

Further object of the present invention is to provide a knee protector of the above character in which constituent parts of a projection carrying a padding are simply shaped. Thus such parts may preferably be made of a thin sheet metal which is permanently deformable.

Still further object of the present invention is to provide a knee protector of the above character, which is easily assembled.

These and further objects, features, and advantages of the present invention will become apparent from the following description when taken in connection with the accompanying drawings, which show, for purpose of illustration only, preferred embodiments in accordance with the present invention, and in which.

Figure 1:
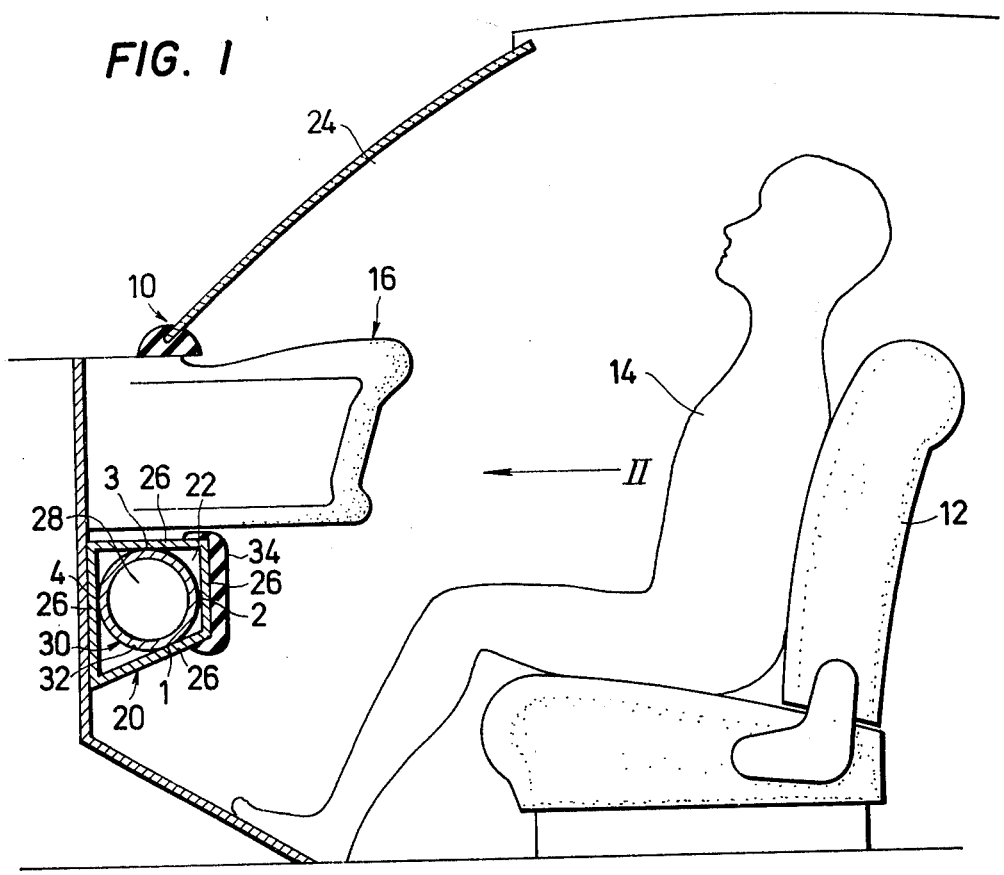
FIG. 1 is a schematic side view, partially in cross section, taken through a line 1a—1a, or 1b—1b, or 1c—1c, of a motor vehicle which is equipped with a plurality of knee protectors and illustrating a first preferred embodiment of a knee protector in accordance with the present invention.
Figure 2:
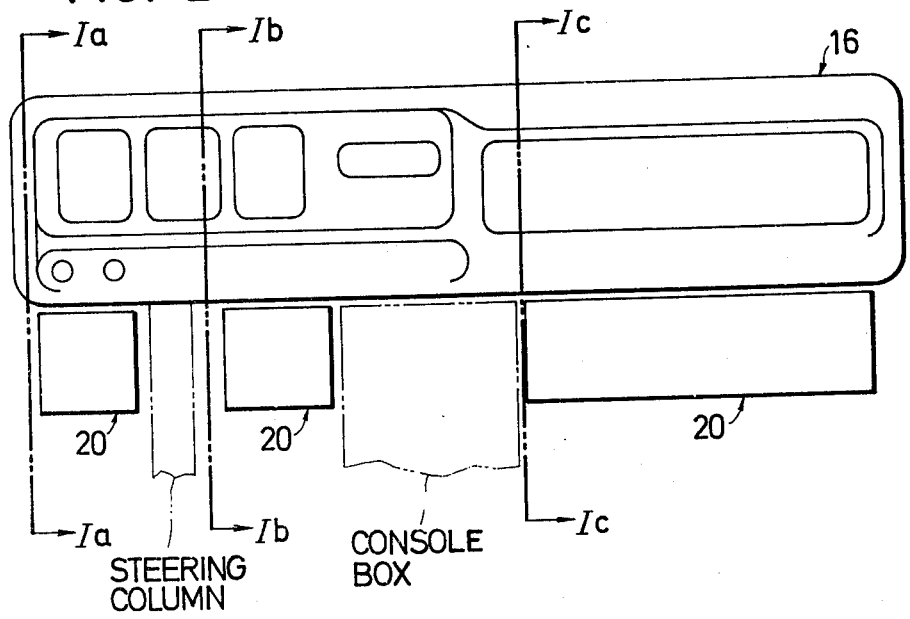
FIG. 2 is a schematic elevational view taken along arrow II of FIG. 1.
Figure 3:
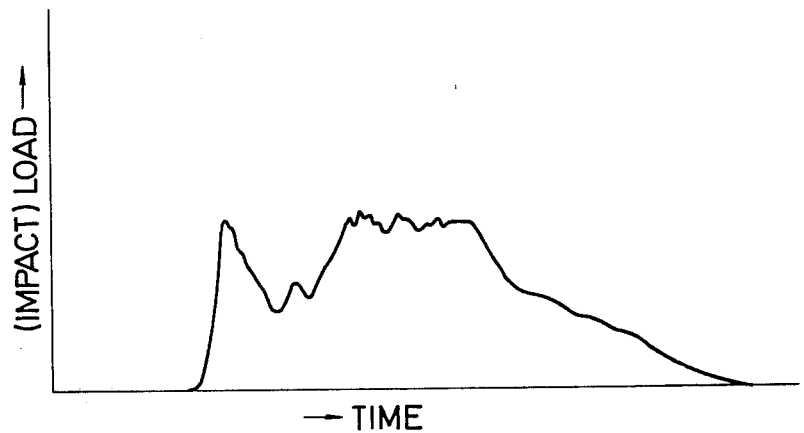
FIG. 3 is a graph showing a curve representing the impact load-time relationship with the knee protector of FIG. 1 under the force of impact by a vehicle passenger during a collision.

Referring now to the drawings wherein like reference numerals are used throughout various views to designate like parts and more particularly to FIGS. 1-3 a conventional instrument panel generally designated by reference numeral 16 is installed in a well-known manner on the inside of a motor vehicle 10 having a seat 12 for a passenger 14. A knee protector generally designated by reference numeral 20 has an outer hollow body 22. The outer hollow body 22 is anchored in the foot space below the instrument panel 16 within the vehicle interior 24. The hollow body 22 includes four permanently deformable flat support walls 26 and a bore 28 defined by the support walls 26. Preferably, the support walls 26 are formed from a thin sheet metal.

To achieve desired rigidity in the bore 28, a permanently deformable rounded wall or member 30, preferably made of a thin sheet metal, which forms a tube 32, is disposed in the bore 28. The tube 32 is sized and arranged within the bore 28 so that it abuts all the support walls 26 at 1, 2, 3 and 4. That one support wall 26 which the knee of the passenger 14 abut is covered with a padding 34, preferably made of any known foamed material or the like. The curve shown in FIG. 3 represents a deformation characteristic of the knee protector 20 described above with reference to FIG. 1. Alternatively, the tube 32 may be secured to all the support walls 26 at 1, 2, 3 and 4, such as by welding (see FIG. 1). It should be noted that if the tube is welded to the support walls 26, the knee protector 20 represents a different deformation characteristics from the curve of FIG. 3.

Figure 4A:
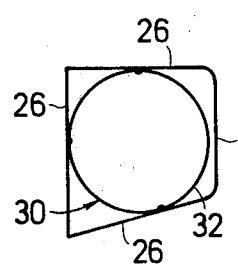
FIGS. 4A-4C are schematic cross sectional views, illustrating other embodiments of knee protectors in accordance with the present invention, respectively.
Figure 4B:
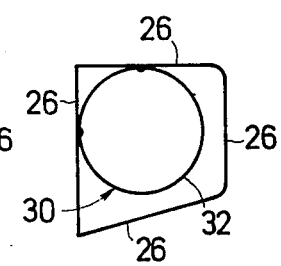
Figure 4C:
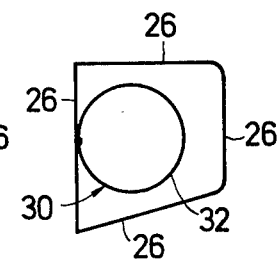

Although in the first embodiment shown in FIG. 1 the tube 32 abuts or is secured to all the support walls 26 at four points, a similar tube 32 may be spaced apart away from that one support wall which the knees of the passenger abut to provide a void spacing, as will be seen in FIGS. 4A-4C in order to form impact zones matching different requirements. In FIG. 4A, tube 32 is secured to all the other three support walls 26, in FIG. 4B tube 32 the two of the other support walls 26 including the opposite support wall from that support wall which the knees of the passenger abut (see FIG. 1), and in FIG. 4C tube 32 only the opposite support wall 26. It will be appreciated that deformation characteristic varies by increasing the void spacing available between the tube 32 and that one support wall which the knees of the passenger abut and also by altering the contacting point or points between the tube 30 and the support wall or walls 26 in number and in location relative to the support walls 26.

Figure 5A:
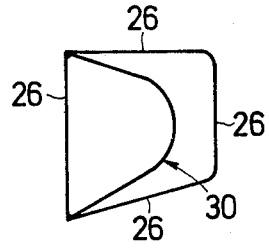
FIGS. 5A-5B are schematic cross sectional views similar to FIGS. 4A-4C, illustrating still other embodiments of knee protectors in accordance with the present invention, respectively.
Figure 5B:
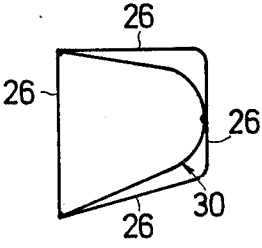

In the preceding various views heretofore described, a permanently deformable rounded wall takes the form of a tube. Such a rounded wall may take the form of a shape as shown in FIGS. 5A and 5B. Referring to FIG. 5A, a permanently deformable rounded wall 30 has edges abutting or secured to the adjacent corner portions of permanently deformable support walls and it projects toward that support wall upon which the force of impact of a passenger acts, but spaced apart from the same. The rounded wall may abut or is secured at its rounded cups to that support wall 26 upon which the force of impact acts (see FIG. 5B).

What is claimed is:
1. In a motor vehicle having a seat for a passenger:
   a knee protector anchored in a foot space of the passenger, said knee protector comprising an outer hollow body having a bore and permanently deformable flat support walls defining said bore, and a single permanently deformable inner tube disposed within said bore, said inner tube making a contact with each of said permanently deformable walls.

2. A knee protector as claimed in claim 1, in which said contact is an abutting contact.

3. A knee protector as claimed in claim 1, in which said contact is a secured contact.

4. In a motor vehicle having a seat for a a knee protector anchored in a foot space of the passenger, said knee protector comprising an outer hollow body having a bore and permanently deformable flat support walls defining said bore, and a single permanently deformable inner tube disposed within said bore, said inner tube making a contact with at least one of said permanently deformable walls, in which said tube is spaced from that one of all of said permanently deformable support walls which faces the knees of a seated passenger.

5. A knee protector as claimed in claim 4, in which said tube makes a contact with each of the other of all of said permanently deformable support walls.

6. A knee protector as claimed in claim 5, in which said contact is an abutting contact.

7. A knee protector as claimed in claim 5, in which said contact is a secured contact.

8. A knee protector as claimed in claim 4, in which said tube makes a contact with two of the other of all of said permanently deformable support walls.

9. A knee protector as claimed in claim 8, in which said contact is an abutting contact.

10. A knee protector as claimed in claim 8, in which said contact is a secured contact.

11. A knee protector as claimed in claim 4, in which said tube makes a contact with one of the other of all of said permanently deformable support walls, opposite to said that one permanently deformable support wall.

12. A knee protector as claimed in claim 11 in which said contact is an abutting contact.

13. A knee protector as claimed in claim 11, in which said contact is a secured contact.

14. In a motor vehicle having a seat for a passenger: a knee protector anchored in a foot space of the passenger, said knee protector comprising an outer hollow body having a bore and permanently deformable flat support walls defining said bore, and a permanently deformable inner rounded wall having two edges, disposed within said bore, said rounded wall having its edges contacting with adjacent corner portions of said permanently deformable support walls and projecting toward a one of all of said permanently deformable support walls which faces the knees of a seated passenger.

15. A knee protector as claimed in claim 14, in which said rounded wall makes a contact with said that one permanently deformable support wall.

16. A knee protector as claimed in claim 15, in which said contact is an abutting contact.

17. A knee protector as claimed in claim 15, in which said contact is a secured contact.

18. A knee protector as claimed in claim 14, in which said rounded wall is spaced from said that one permanently deformable support wall.

* * * * *